Oct. 29, 1929.  E. BRYE  1,733,774
SNOW RUNNER FOR VEHICLES
Filed Jan. 29, 1927
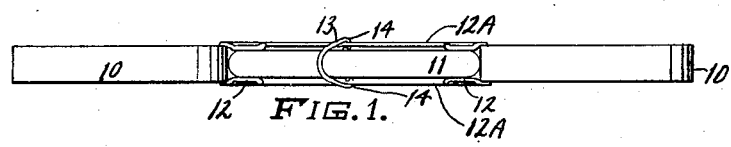
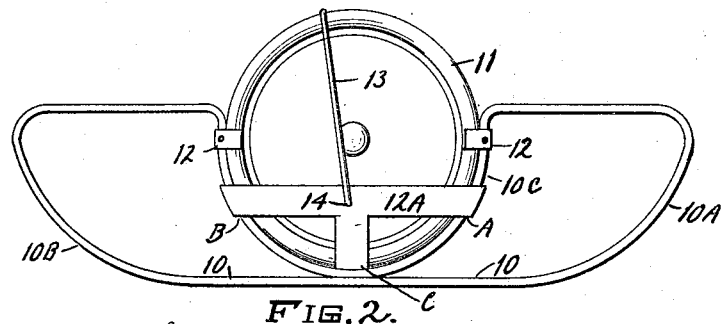
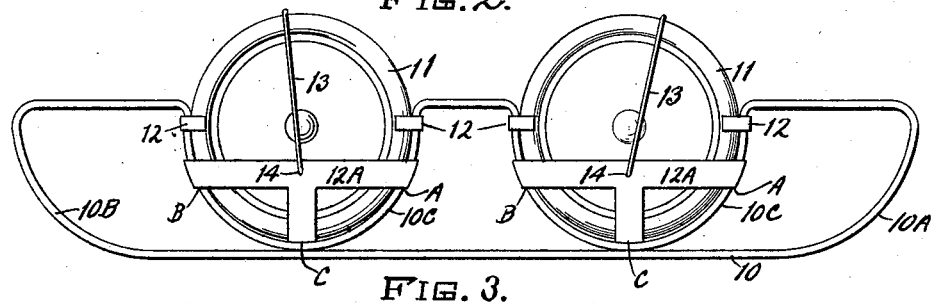
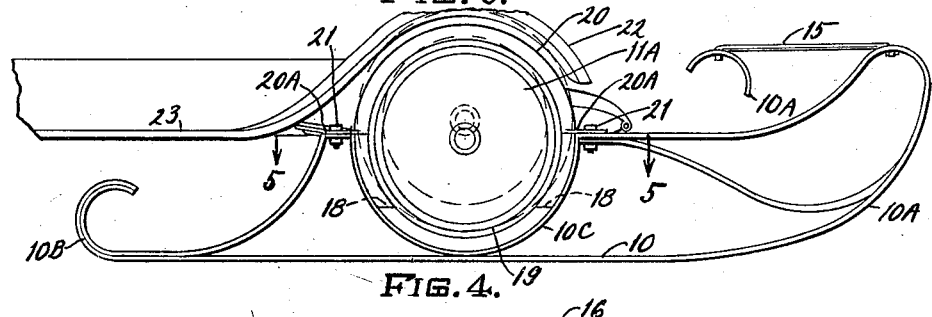
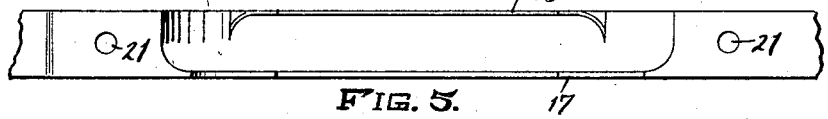
INVENTOR:
Edvin Brye
BY David E. Carlsen
ATTORNEY Patented Oct. 29, 1929

1,733,774

UNITED STATES PATENT OFFICE

EDVIN BRYE, OF NORTHFIELD, MINNESOTA

SNOW RUNNER FOR VEHICLES

Application filed January 29, 1927. Serial No. 164,472.

My invention relates to a snow runner for vehicles of various types and the object is to provide a simple, inexpensive and efficient runner which is particularly adaptable in small sizes for baby carriages and also adaptable for the front wheels of automobiles in larger sizes.

In the accompanying drawing:

Fig. 1 is a top or plan view and Fig. 2 is a side elevation of my improved snow runner in a form adaptable for two-wheeled baby carriages or so-called "go-carts."

Fig. 3 is a side elevation of my runner as made and applied to the two wheels on one side of a four-wheeled baby carriage or like vehicle.

Fig. 4 is a slightly perspective side elevation of a modified form of my runner as applied to the front wheels of an automobile and Fig. 5 is an enlarged top view about as on line 5—5 in Fig. 4.

Referring to the drawing by reference numerals, 10 designates a bar metal runner comprising a straight ground engaging part from which it is curved upwardly both forwardly and rearwardly as at 10A and 10B respectively, to a predetermined level thence bent back toward the center from both ends on a common level (see Figs 1, 2 and 3). The bar is bent downwardly from its upper level to form an approximately semi-circular part 10C in which a vehicle wheel, as 11 in Fig. 1, may rest snugly. The center of said semi-circular part may rest on the lower straight part of the runner. 12 are a pair of inwardly opening U-shaped clips or guides on the runner near the top of its centrally arched part for engaging and holding the tire or felly of the wheel 11. The lower part of the arch 10C is guarded on both sides by a preferably T-shaped guard 12A which engages both sides of the wheel felly below its axle, said guard being suitably fixed as at A, B and C to said arch 10C.

In Fig. 3 I have illustrated two downwardly arched parts 10C, spaced apart to receive two wheels 11 at one side of a vehicle such as a four wheeled baby carriage. In such vehicles the wheels are usually of standard uniform size and about the same size as the wheels of a two-wheeled baby carriage sometimes known as a sulky.

13 is a bail of suitable material fulcrumed at 14 in horizontally opposite central parts of the parallel T-frames 12A, said bail being of a length to be freely swung up from a lower free position to frictional contact with the top part of wheel 11 (see Figs. 2 and 3).

In Fig. 4 my device is shown in modified form for use on the front wheels 11A of an automobile. In this device the front ends of the pair of runners 10 may be connected by a bar 15. The wheel receiving part 10C may have its lower inner side provided with a vertical flange 16 and its outer side having a flange 17 extending to about the horizontal line 18 and arched as on line 19 (Fig. 4) said flanges retaining the lower part of the tire between them. The upper part of the wheel (or tire) is suitably engaged by an arched shell 20 having horizontal end lugs 20A adapted to be clamped onto the upper part of the runner by bolts or other securing means 21. 22 shows the auto fender and 23 the running board. To put on these runners it will be readily understood that the front end of the auto is jacked up so that the wheels are about in the dotted position (Fig. 4) to clear the flanges 16 and 17, then the wheels are let down between said flanges and the shell 20 is bolted in place. The runners are of course steered according to the turning of the wheels by the usual automobile steering means (not shown).

I claim:

A sleigh runner adaptable for application to a vehicle wheel, said runner comprising a horizontal ground engaging elongated bar curved upwardly, forwardly and rearwardly, thence horizontally and parallel over the ground engaging part, said upper parts bent downwardly in arcuate form to receive the lower portion of a vehicle wheel, auxiliary wheel engaging means fixed to said wheel engaging part of the runner and means for engaging the upper part of said vehicle wheel to hold it in alinement with the plane of the runner, said auxiliary wheel engaging means comprising a pair of U-shaped clips fixed on the runner adjacent its upper horizontal parts and directed with their open ends toward each other to guidingly engage diametrically opposite parts of said wheel, horizontally disposed wheel retaining members fixed in parallel relation to each other near the lower central part of the runner for simultaneously engaging opposite sides of the lower part of the wheel, said means for engaging the upper part of the wheel comprising a bail pivotally retained in said lower wheel retaining members and adapted to be swung upwardly and frictionally engage the upper rim portion of the wheel.

In testimony whereof I affix my signature.

EDVIN BRYE.